T. KARLE.
KING BOLT SPRING.
APPLICATION FILED OCT. 21, 1907.
No. 904,067.
Patented Nov. 17, 1908.
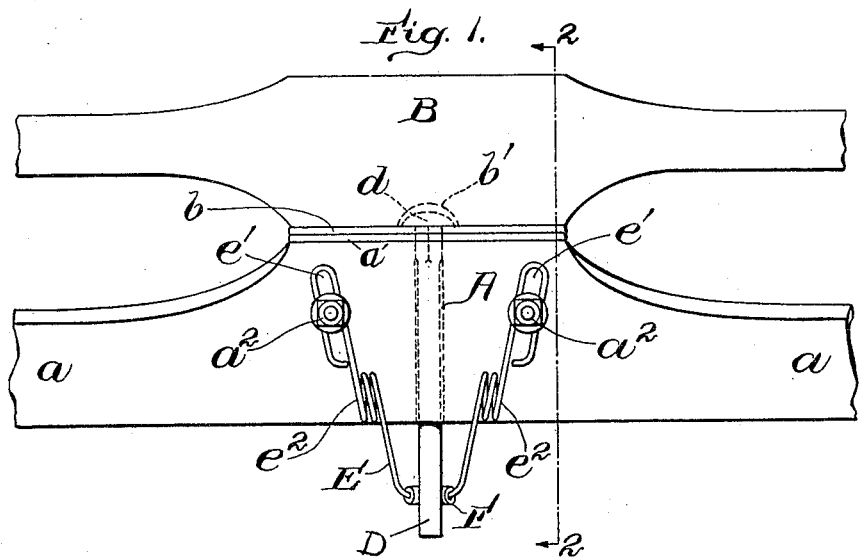
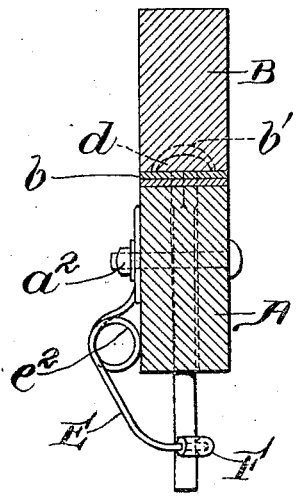
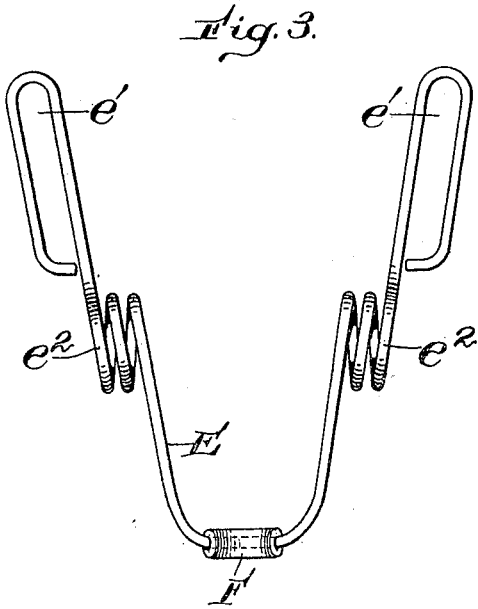
Witnesses:
Inventor:
Timothy Karle,
by Oliver R. Mitchell,
Attorney.

UNITED STATES PATENT OFFICE.

TIMOTHY KARLE, OF BOSTON, MASSACHUSETTS.

KING-BOLT SPRING.

No. 904,067.     Specification of Letters Patent.     Patented Nov. 17, 1908.

Application filed October 21, 1907. Serial No. 398,373.

*To all whom it may concern:*

Be it known that I, TIMOTHY KARLE, a citizen of the United States, and resident of Boston, in the county of Suffolk and State of Massachusetts, have invented new and useful Improvements in King-Bolt Springs, of which the following is a specification.

My invention relates to improvements in connection between the front axle of a vehicle and the body and relates particularly to control of the king bolt by means of which the axle is connected to the head block which supports the body of the vehicle, and the objects of my invention are to prevent wear and enlargement of the aperture in the axle or head block through which the king bolt passes to connect the two parts and to prevent rattling and noise in use in the jumping of the king bolt under various stresses to which it is subjected. I attain these ends by the use of a spring of novel construction and organization of the parts which is adjustable to fit any vehicle to which it may be desirable to attach it and is exceedingly cheap to manufacture and cheap to attach to the vehicle requiring little labor and no skill.

In the drawings,—Figure 1 shows in elevation my device applied to an axle, the king bolt and the king bolt socket in the head block being indicated in dotted lines; Fig. 2 is a cross section on line 2—2 of Fig. 1 looking in the direction of the arrow; and Fig. 3 shows the spring in elevation upon an enlarged scale for clearness.

In the drawings A represents the axle bed and $a$ the axle which is broken off, B represents the head block, D the king bolt and E the spring. The spring E is preferably forked or U shaped, that is, bent at its middle portion to form two ends pointing in the same direction, and the several ends of the spring thus bent are preferably bent to form a loop or slot $e'$. About midway of each forked end of the spring E is preferably a spiral coil $e^2$ and mounted at the junction of the two forked ends of the spring is a wear resisting saddle F removably secured upon the spring at that point. As shown in the drawings the opposed surfaces of the head block B and the axle bed A are shod with metal strips $b$ and $a'$ respectively and in the lower side of the head block B is a socket $b'$ to receive the head $d$ of the king bolt when the parts are assembled.

The parts are assembled as shown in the drawings, the head block to which is secured the body of the vehicle being adjusted above the axle bed A and connected by the king bolt which is secured to the head block and passes through the axle. To one side of the axle is secured the spring E the looped ends $e'$ passing over a bolt through the axle, a nut being screwed down upon the bolt to secure the bolt and hold the spring in its adjusted position. The loop $e'$ renders it easy to move the spring up or down as may be desired and the forked nature of the spring renders it easy to spread the ends of the spring within a wide range to reach the bolts. The bolts to which the ends of the spring are secured as shown in the drawings, are found in nearly every vehicle being the bolts to which a reach is secured which passes forward to the cross bar of the shaft to which the whiffletree is pivoted. At the junction of the two forked ends is mounted a wear resisting saddle F of suitable material which may be removed and replaced as desired and which in action bears upon and receives the wear of the king bolt. By reference to Fig. 2 it will be seen that the force of the spring is employed to press on the king bolt transversely below the axle and the spring, which is preferably a heavy and powerful spring, forces the king bolt to one side of the aperture in the axle and binds it tightly therein, preventing vertical movement as well as lateral movement of the king bolt. The wear resulting from the friction between the king bolt and the spring is received by the saddle F and as this becomes worn it may be removed and replaced. The arrangement thus above described controls movement of the king bolt in all directions both vertical and lateral. The spring itself, as will be seen, is exceedingly simple and cheap in its construction and owing to its shape it is feasible to apply it to any vehicle with a minimum of labor and expense. The reach bolts $a^2$ vary somewhat in their position in the axle but by means of the slotted ends $e'$ and the possibility of spreading apart the forked ends of the spring, the spring may be adjusted to be attached by means of these reach bolts $a^2$ without the necessity of making any special provision for attachment to the spring.

I claim:

1. In combination, a head block and an axle connected by a king-bolt; that king-bolt; a spring secured to the axle upon one side and passing below and toward the other side of the axle, to the other side of the king-bolt, and pressing the king-bolt transversely, substantially as described.

2. In combination, a head block and an axle connected by a king-bolt; that king-bolt; a forked spring secured to the axle and bent laterally to pass around the king-bolt and engage the king-bolt upon the side opposite to that upon which the spring is secured to the axle, substantially as described.

3. As a new article of manufacture, a spring having a substantially horizontal U shaped portion adapted to lie behind and engage the lower end of the king-bolt of a vehicle, a cushioning saddle located at the bight of said U shaped portion, the legs of said U shaped portion being bent upwardly and terminating at their ends in elongated looped portions, and said legs being bent to form coiled springs adapted to rest against the axle bed of the vehicle.

4. As a new article of manufacture, a spring having a substantially horizontal U shaped portion adapted to lie behind and engage the lower end of the king-bolt of a vehicle, a cushioning saddle located at the bight of said U shaped portion, the legs of said U shaped portion being bent upwardly and terminating at their ends in elongated looped portions, and said legs being bent to form coiled springs adapted to rest against the axle bed of the vehicle, in combination with an axle bed and a king-bolt, said cushioning saddle lying against said king-bolt, and bolts passing through the axle bed and through said elongated loops and nuts threaded upon said bolts and binding the device in position.

Signed by me at Boston, Massachusetts, this nineteenth day of October, 1907.

TIMOTHY KARLE.

Witnesses:
  JOSEPH T. BRENNAN,
  CHARLES D. WOODBERRY.